United States Patent
Wong et al.

(10) Patent No.: US 11,005,557 B2
(45) Date of Patent: May 11, 2021

(54) TELECOMMUNICATIONS APPARATUS AND METHODS

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,779

(22) PCT Filed: Jul. 19, 2017

(86) PCT No.: PCT/EP2017/068256
§ 371 (c)(1),
(2) Date: Feb. 7, 2019

(87) PCT Pub. No.: WO2018/028958
PCT Pub. Date: Feb. 15, 2018

(65) Prior Publication Data
US 2019/0173561 A1 Jun. 6, 2019

(30) Foreign Application Priority Data
Aug. 12, 2016 (EP) .................................. 16184118

(51) Int. Cl.
*H04B 7/08* (2006.01)
*H04B 7/06* (2006.01)

(52) U.S. Cl.
CPC .......... *H04B 7/088* (2013.01); *H04B 7/0695* (2013.01)

(58) Field of Classification Search
CPC ..... H04W 16/02; H04W 16/12; H04W 16/14; H04W 16/24; H04W 16/28; H04W 16/30; H04W 72/046; H04W 72/082; H04W 72/085; H04B 7/0408; H04B 7/088; H04B 7/0602–0617; H04B 7/0695
See application file for complete search history.

(56) References Cited

U.S. PATENT DOCUMENTS

| | | | |
|---|---|---|---|
| 6,400,955 B1 * | 6/2002 | Kawabata | H04W 16/02 455/450 |
| 2002/0058514 A1 * | 5/2002 | Senarath | H04W 16/28 455/450 |

(Continued)

OTHER PUBLICATIONS

Holma et al., "LTE for UMTS OFDMA and SC-FDMA Based Radio Access", System Architecture based on 3GPP SAE, ISBN 978-0-470-99401-6, Wiley 2009, 11 pages.

(Continued)

*Primary Examiner* — Habte Mered
*Assistant Examiner* — Prince A Mensah
(74) *Attorney, Agent, or Firm* — Xsensus LLP

(57) ABSTRACT

Infrastructure equipment for use with a wireless telecommunications system, the infrastructure equipment operable to transmit radio signals for reception by a terminal device located within a first one of a plurality of predetermined geographical regions during a first portion of a periodically repeating time duration and to transmit radio signals for reception by a terminal device located within a second, different, one of the plurality of predetermined geographical regions during a second, different, portion of the periodically repeating time duration.

11 Claims, 12 Drawing Sheets

(56) References Cited

U.S. PATENT DOCUMENTS

| | | | | |
|---|---|---|---|---|
| 2002/0115474 | A1* | 8/2002 | Yoshino | H04W 16/24 455/562.1 |
| 2005/0070266 | A1* | 3/2005 | Senarath | H04W 16/12 455/422.1 |
| 2009/0116565 | A1 | 5/2009 | Ahn et al. | |
| 2009/0225728 | A1* | 9/2009 | Tao | H04B 7/043 370/337 |
| 2011/0038308 | A1 | 2/2011 | Song et al. | |
| 2016/0286563 | A1* | 9/2016 | Shirakata | H04W 16/28 |
| 2017/0054534 | A1* | 2/2017 | Sang | H04L 5/0032 |
| 2017/0126303 | A1* | 5/2017 | Jo | H04B 7/0617 |

OTHER PUBLICATIONS

Yi et al., "Beam Design in Opportunistic space time multiple access", 3GPP2, pp. 1-11.

Nokia, Alcatel-Lucent Shanghai Bell, "Support for Beam Based Common Control Plane", 3GPP TSG-RAN WG1#85 R1-165364, Nanjing, P.R. China, May 23-27, 2016, 5 pages.

NTT Docomo, "New SID Proposal: Study on New Radio Access Technology", 3GPP TSG RAN Meeting #71 RP-160671, Göteborg, Sweden, Mar. 7-10, 2016, 8 pages.

International Search Report dated Sep. 29, 2017 for PCT/EP2017/068256 filed on Jul. 19, 2017, 8 pages.

\* cited by examiner

TELECOMMUNICATIONS APPARATUS AND METHODS

CROSS-REFERENCE TO RELATED APPLICATIONS

The present application is based on PCT filing PCT/EP2017/068256, filed Jul. 19, 2017, and claims priority to 16184118.4, filed in the European Patent Office on Aug. 12, 2016, the entire contents of each of which are being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to efficiently support connectivity for a wide range of devices associated with different applications with different characteristic data traffic profiles, resulting in different devices have different operating characteristics/requirements, such as:
 High latency tolerance
 High data rates
 Millimetre wave spectrum use
 High density of network nodes (e.g. small cell and relay nodes)
 Large system capacity
 Large numbers of devices (e.g. MTC devices/Internet of Things devices)
 High reliability (e.g. for vehicle safety applications, such as self-driving cars).
 Low device cost and energy consumption
 Flexible spectrum usage
 Flexible mobility The introduction of new radio access technology (RAT) systems/networks therefore gives rise to new challenges. One such challenge is the need to develop effective techniques for alleviating inter-cell radio interference in NR.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
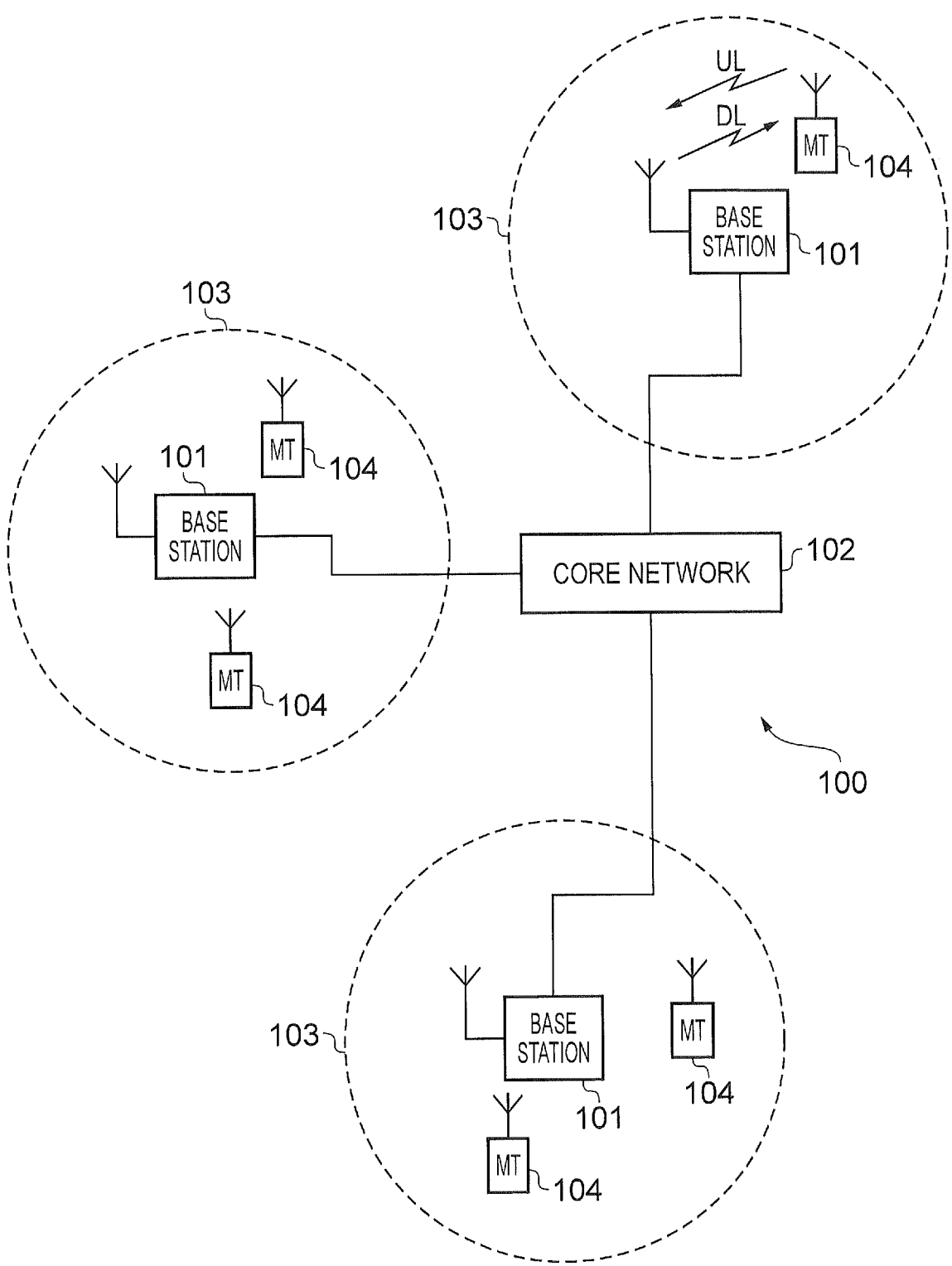
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs (eNBs), and so forth.

In terms of broad top-level functionality, the network architecture of a new RAT will have a similar general arrangement to that shown for current LTE networks in FIG. 1. In particular, a new RAT network architecture will include a core network component, a number of base stations and a number of terminal devices which operate together so as to allow exchange of data between terminal devices on the network. It will be appreciated that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of FIG. 1. In particular, in the new RAT, each base station will be connected to the core network. Each base station will provide a coverage area (i.e. a cell) within which data can be communicated to and from terminal devices. Data will be transmitted from base stations to terminal devices within their respective coverage areas via a radio downlink. Data will be transmitted from terminal devices to the base stations via a radio uplink. The core network will route data to and from the terminal devices via the respective base stations. This functional equivalence is sufficient for an understanding of the present technique.

In 3GPP a Study Item (SI) on New Radio Access Technology (NR) has been agreed [2]. This SI is to study and to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Operation with high frequency carriers such as mm wave (for example, 20 GHz-100 GHz) enable large frequency bandwidth (for example, a few hundred MHz to 1 GHz) to be used, thus offering very high throughput for eMBB services and supporting large capacity. However, operation in such high frequency leads to very high propagation loss, leading to small coverage (for example, producing a cell radius of the order of only 10s of meters).

Figure 2:
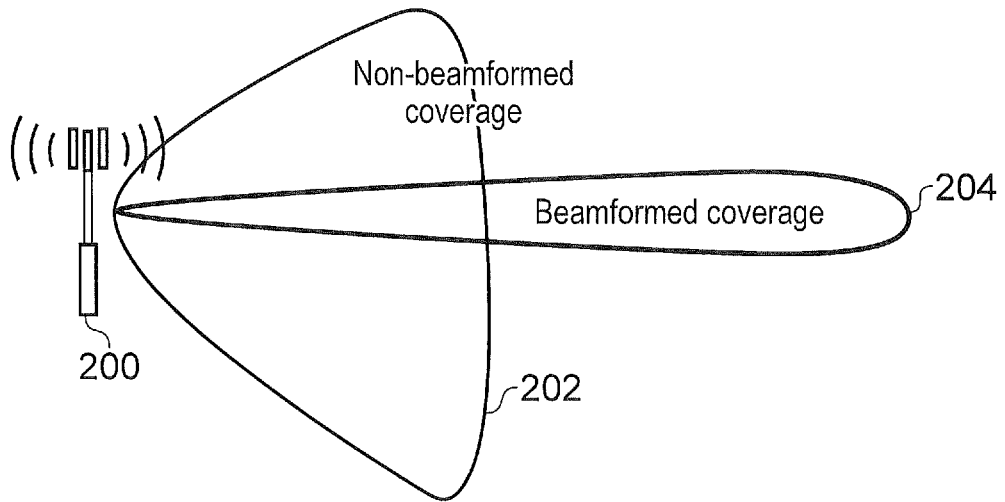
FIG. 2 schematically illustrates a non-beamformed radio signal coverage and beamformed radio signal coverage.

One way of overcoming the poor coverage of a mm wave is to beam form the signal, that is, to concentrate the energy of the signal within a narrow beam. This allows signals to be transmitted from an eNB to a terminal device over larger distances. FIG. 2 shows an example of the coverage achieved with and without beamforming at an eNB 200. Use of a conventional sectorised antenna at the eNB without beamforming covers a first geographical coverage area 202 which is broader but which has a shorter reach. On the other hand, if beamforming is used, a second geographical coverage 204 which is narrower but which reaches larger distances is covered. This second geographical region 204 defines a beam. It is noted that, since the wavelength of a mm wave is small, a large number of antenna elements (for example, 10s to 100s) can be packed into a Transmission & Reception Point (TRP) (the TRP being provided by infrastructure equipment such as an eNB, for example), thereby giving much higher flexibility in forming beams (that is, beams can be made to be very narrow).

In conventional networks, beamforming is typically used for UE specific data where, for example, the UE feeds back beamforming weights (for example, pre-coding vectors) to the eNB and the eNB select a suitable set of precoding weights to form a beam directed towards the UE. This method, however, only increases the coverage of UE specific data, and thus cannot be used for common channels for common messages such as the MIB (Master Information Block) or SIB (System Information Block).

Figure 3:
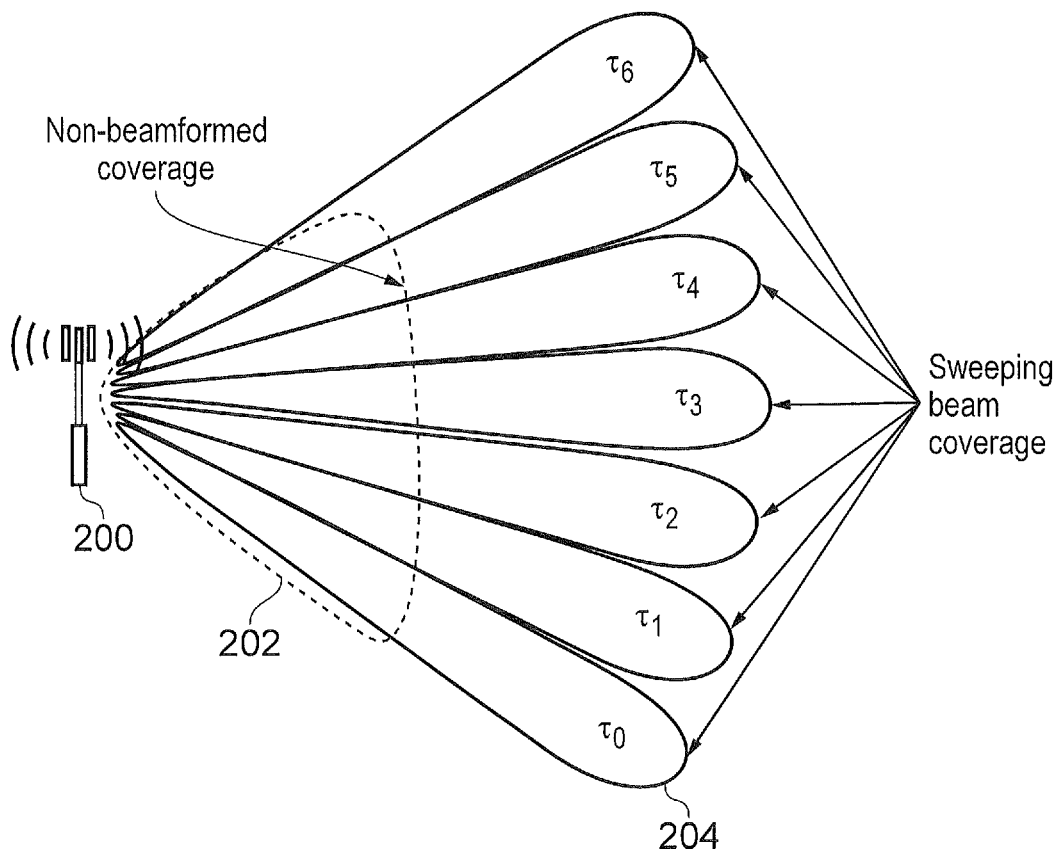
FIG. 3 schematically illustrates sweeping beamformed radio signal coverage.

Beam sweeping is proposed in [3] in order to extend the coverage for common channels. Here, the beam providing common channels is "swept", that is, directed at different angles at different times. An example of this is shown FIG. 3, where the eNB 200 initially forms the beam 204 at a starting position and maintains the beam at this starting position for an initial time period $\tau 0$. The eNB 200 then changes the position of the beam over time. In this particular example, the beam position is changed by X° and maintained at this position for a time period $\tau 1$, is changed by another X° and maintained at this position for a time period $\tau 2$, is changed by another X° and maintained at this position for a time period τ3 and so on. This continues until the end of time period τ6 is reached, at which point, the beam sweeping starts again (that is, the beam is repositioned at the same position as it was for the time period time τ0 and the sweep is restarted). This enables the eNB to transmit the common channel over a larger area, over a predetermined time period, compared to the non-beamformed coverage 202.

The present technique helps to reduce interference resulting from the use of beam sweeping in a network of cells.

Figure 4B:
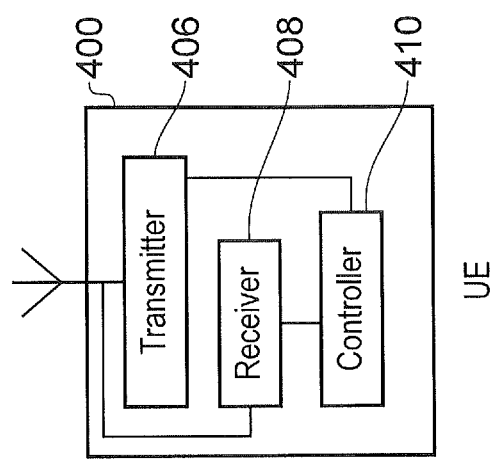
FIG. 4B schematically illustrates a terminal device according to an embodiment.
Figure 4A:
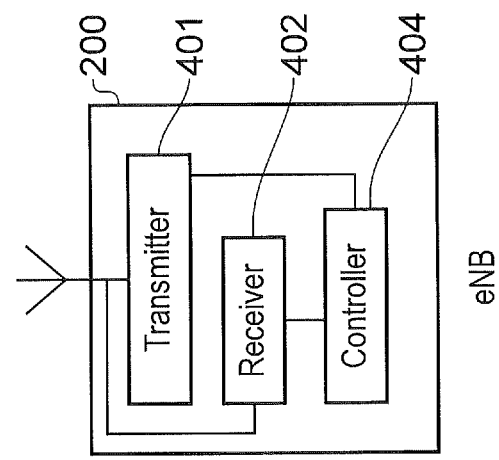
FIG. 4A schematically illustrates network infrastructure equipment according to an embodiment.

FIG. 4A shows an NR eNB 200, which is an example of infrastructure equipment for providing a TRP according to the present technique. The eNB 200 comprises a transmitter 401 configured to transmit wireless signals, a receiver 402 configured to receive wireless signals and a controller 404 configured to control the eNB 200. The transmitter 401 and receiver 402 together form a transceiver. According to an embodiment of the present technique, the controller 404 is operable to control the transceiver 401, 402 to transmit radio signals (such as common channel radio signals) for reception by a terminal device (such as UE 400) located within a first one of a plurality of predetermined geographical regions (each predetermined geographical region defining the geographical coverage area of a beam 204 in a particular position, for example) during a first portion of a periodically repeating time duration. The controller 404 is also operable to control the transceiver to 401, 402 to transmit signals for reception by a terminal device located within a second, different, one of the plurality of predetermined geographical regions during a second, different, portion of the periodically repeating time duration. The first and second portions of the periodically repeating time duration are set such that, for at least one of the first and second predetermined geographical regions, the transceiver transmits signals for reception by a terminal device in the at least one of the first and second predetermined geographical regions only when no transmissions are transmitted from a second infrastructure equipment (for example, another eNB) of the wireless telecommunications system for reception by a terminal device in at least a portion of the at least one of the first and second predetermined geographical regions. In this case, when each of the first and second predetermined geographical regions is considered as defining a geographical coverage area of a beam 204, the above-mentioned "portion" may be considered as a region of that beam which, when that beam is active, is not overlapped by another beam active beam.

A person skilled in the art will appreciate that the transmitted signals defined in the previous paragraph, which may be common channel radio signals (for example), may be broadcast by the eNB. There may therefore not be any UE within the first or second ones of the plurality of predetermined geographical regions when such signals are transmitted. However, it will be appreciated that managing the transmission of these signals in the way defined will reduce interference at a UE in the case that a UE is present within one of the first or second predetermined geographical regions.

FIG. 4B shows a UE 400, which is an example of a terminal device according to the present technique. The UE 400 comprises a transmitter 406 configured to transmit wireless signals, a receiver 408 configured to receive wireless signals and a controller 410 configured to control the UE 400. The transmitter 406 and receiver 408 together form a transceiver. According to an embodiment of the present technique, when the UE 400 is located in a first one of a plurality of geographical regions (each predetermined geographical region defining the geographical coverage area of a beam 204 in a particular position, for example), the controller 410 controls the transceiver 406, 408 to receive radio signals (such as common channel radio signals) from first infrastructure equipment (such as eNB 200) during a first portion of a periodically repeating time duration. Also, when the UE 400 is located in a second, different, one of the plurality of geographical regions, the controller 410 controls the transceiver 406, 408 to receive radio signals from the first infrastructure equipment during a second, different, portion of the periodically repeating time duration. The first and second portions of the periodically repeating time duration are set such that, for at least one of the first and second predetermined geographical regions, when the UE 400 is located within at least a portion of the at least one of the first and second predetermined geographical regions, the transceiver 406, 408 receives signals from the first infrastructure equipment only when no transmissions are received by the UE 400 from second infrastructure equipment (for example, another eNB).

Figure 5:
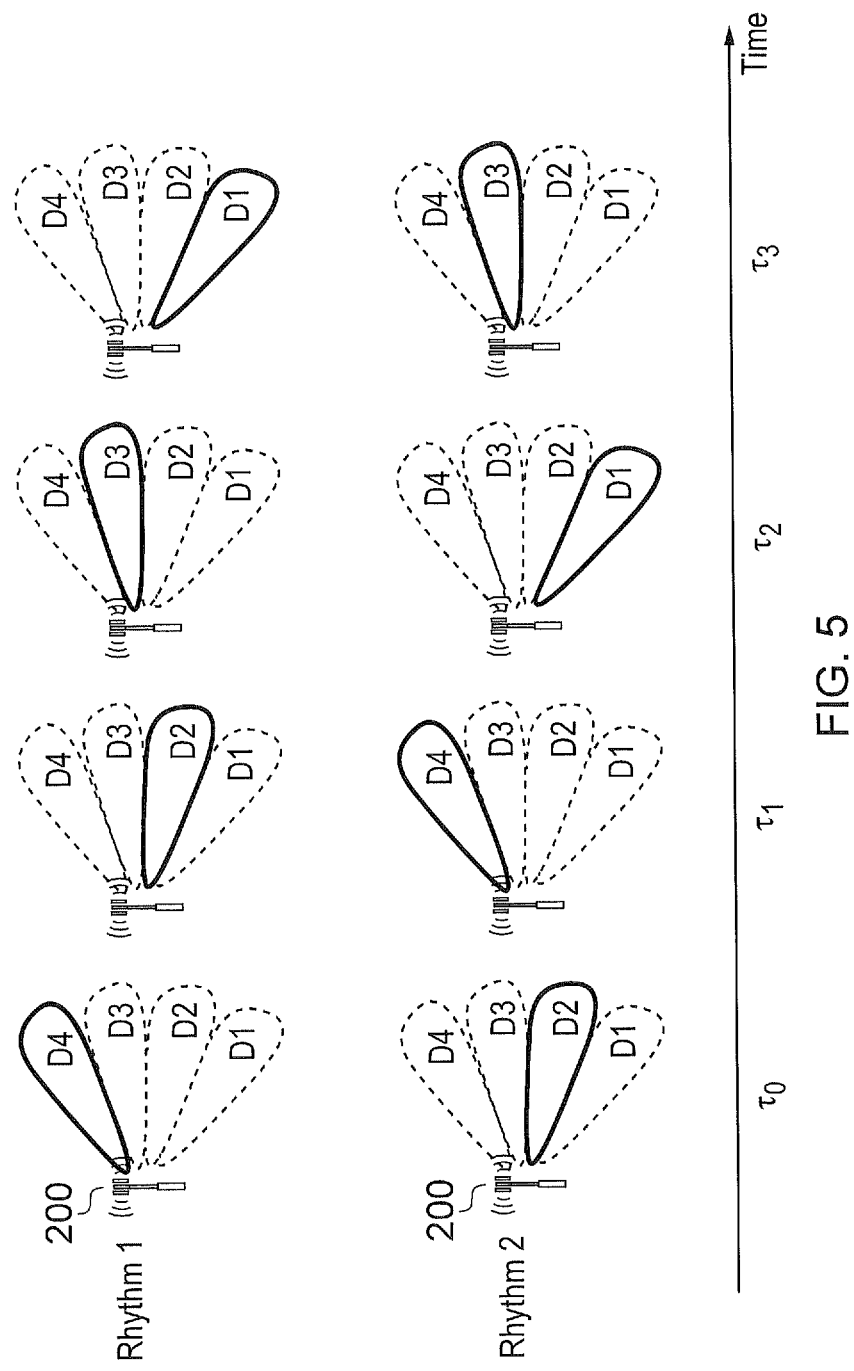
FIG. 5 schematically illustrates two different beam sweeping rhythms.

In an embodiment, a beam sweeping pattern or beam sweeping rhythm is introduced for a particular eNB. This pattern or rhythm defines the sequence of directions of the beam 204. An example of a beam sweeping rhythm is shown in FIG. 5. Here, the common channels are beam swept over 4 different possible beam directions (angles), namely D1, D2, D3 and D4, and the beam position is changed over four consecutive time periods, τ0, τ1, τ2 and τ3 (the time periods τ0, τ1, τ2 and τ3 thus forming respective portions of a periodically repeating time duration). In FIG. 5, two example rhythms, Rhythm 1 and Rhythm 2 are shown. In Rhythm 1, the position of the "active" beam (that is, the beam for which, for the current time period, transmission of signals from the eNB 200 to a UE located within the geographical region defined by the beam is enabled) follows the sequence D4, D2, D3 & D1 for time periods τ0, τ1, τ2 and τ3 respectively (such a sequence may be referred to as {D4, D2, D3 & D1}). On the other hand, for Rhythm 2, the position of the active beam follows the sequence D2, D4, D1 & D3 at time τ0, τ1, τ2 and τ3 respectively (such a sequence may be referred to as {D2, D4, D1 & D3}). It should be appreciated that FIG. 5 shows only two example rhythms and that other rhythms are possible.

Figure 6:
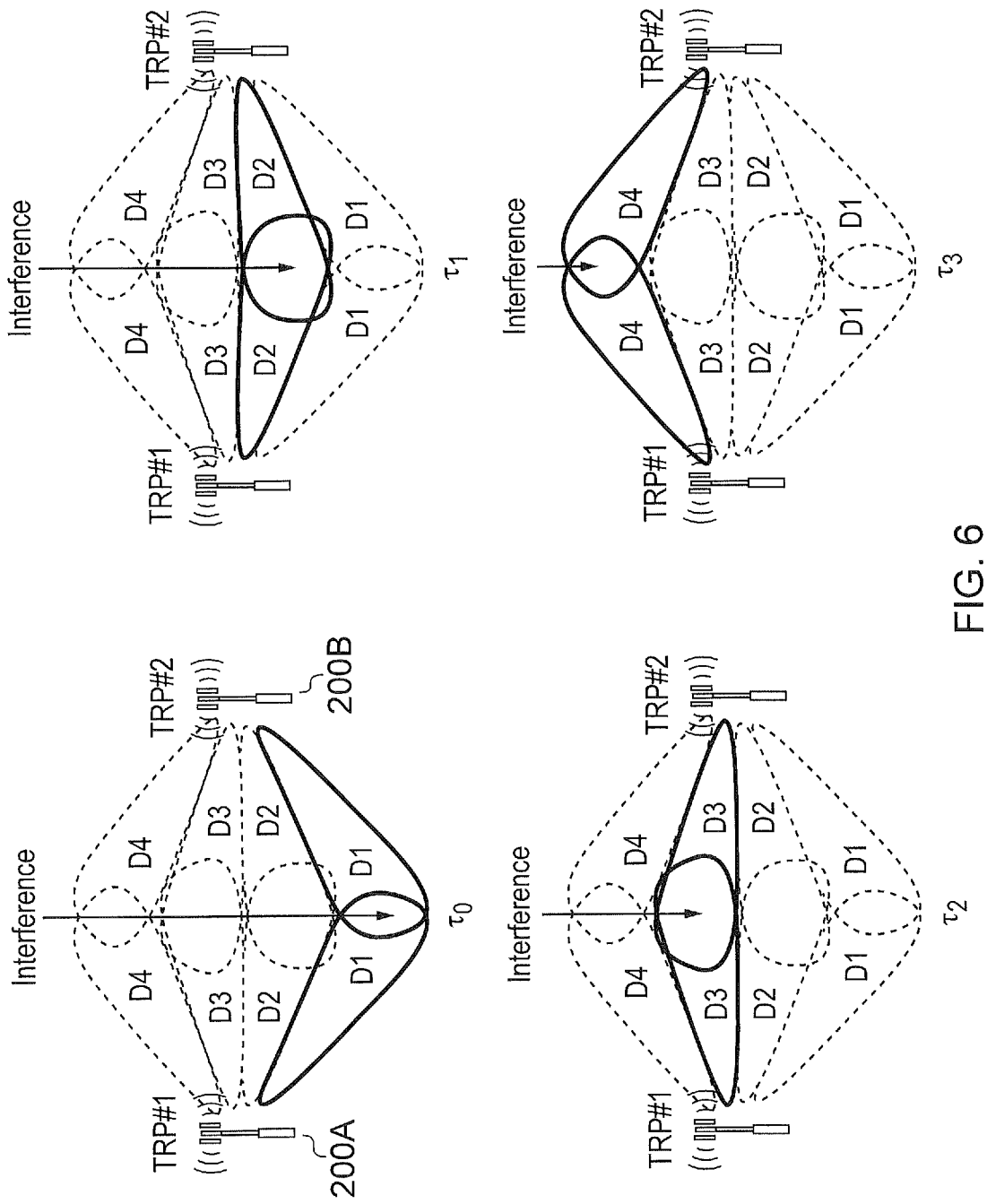
FIG. 6 schematically illustrates respective beam sweeping rhythms of neighbouring Transmission and Reception Points (TRPs) which may result in radio interference.

The present technique recognises that common channels are typically transmitted all the time and that the same beam sweeping rhythm being used for neighbouring TRPs in a network may therefore lead to consistent interference. An example of such interference is shown in FIG. 6. Here the same beam sweeping rhythm of {D1, D2, D3, D4} is used for two neighbouring eNBs 200A and 200B in the network (each of the eNBs 200A and 200B being an example of a TRP and having the same functional structure as the eNB 200 shown in FIG. 4A, for example). As shown in FIG. 6, over a sweeping period comprising consecutive time periods τ0, τ1, τ2 and τ3, the active beams of the two eNBs 200A and 200B will consistently interfere with each other.

Figure 7:
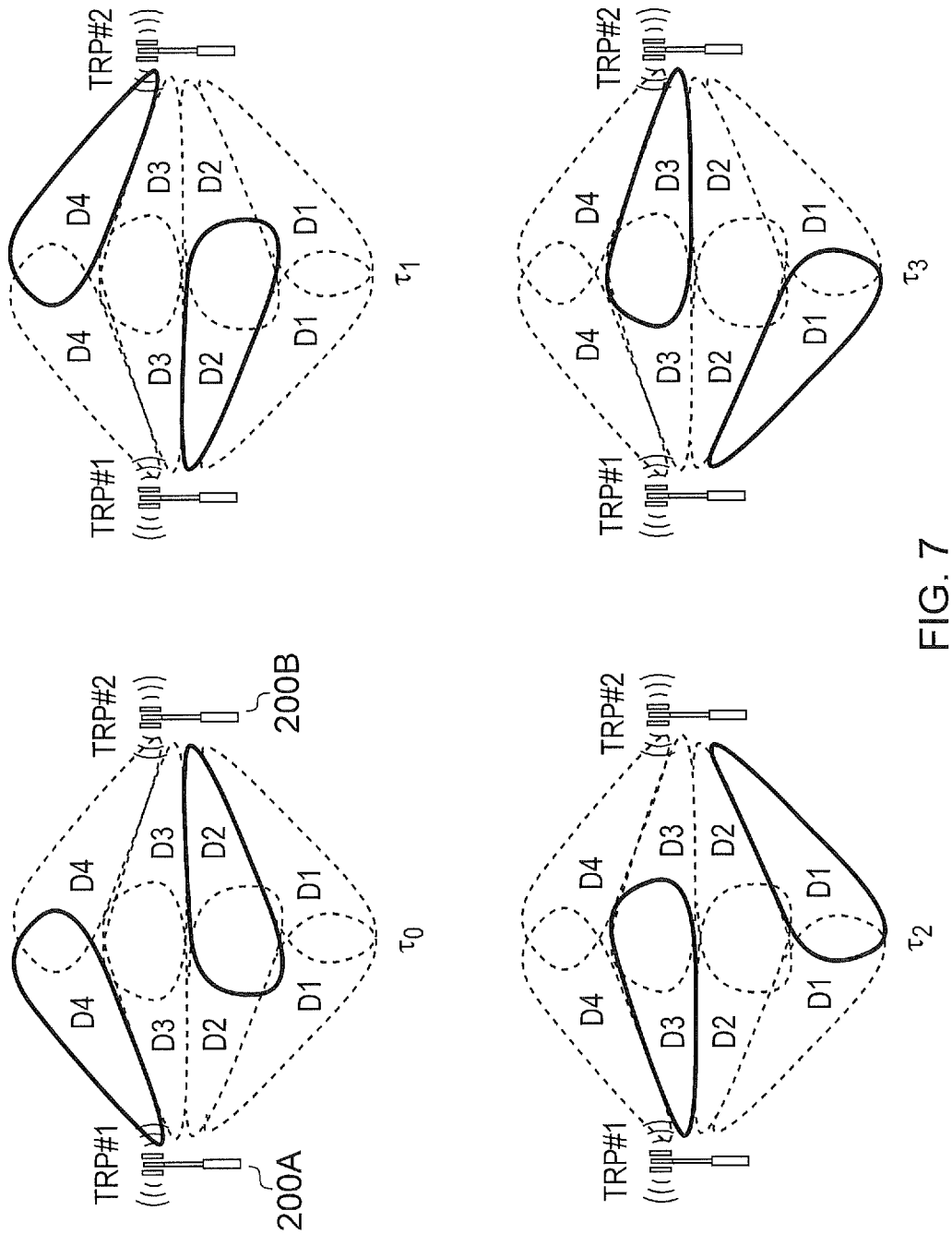
FIG. 7 schematically illustrates respective beam sweeping rhythms of neighbouring TRPs for which radio interference is alleviated.

In order to alleviate this problem, with the present technique, different beam sweeping rhythms are respectively assigned to neighbouring TRPs in the network. An example of such an arrangement is shown in FIG. 7. Here, the consistent inter-cell beam interference exemplified in FIG. 6 is alleviate by the eNB 200A being assigned a different rhythm to that of eNB 200B. In this example, eNB 200A uses rhythm {D4, D2, D3, D1} (this actually being Rhythm 1 in FIG. 5, in this case) and eNB 200B uses rhythm {D2, D4, D1, D3} (this actually being Rhythm 2 in FIG. 5, in this case). The different, non-interfering rhythms assigned to each of the eNBs 200A and 200B may be defined as being orthogonal to each other.

The example in FIG. 7 shows that inter-cell beam interference is completely avoided. However, in some cases, due to multiple cells deployment, it may be difficult to find totally orthogonal rhythms among multiple adjacent cells. However, even in this case, the present technique of assigning different rhythms to different respective neighbouring TRPs (even if those different rhythms are not fully orthogonal) still allows the level of interference to be reduced compared to the situation in which each of the neighbouring TRPs use the same rhythm. For similar reasons, it may also be the case that beams which are simultaneously active in the network in accordance with different rhythms (for example, beams D4 and D2 or beams D3 and D1 in FIG. 7) are not completely non-overlapping. However, in this case, interference may still be alleviated if at least a portion of these beams do not overlap.

In embodiments, different rhythms can have different number of beam directions and/or different beam widths. Furthermore, although, in the above description, each is identified by its direction (that is, D1, D2, D3 or D4), any other suitable means of identifying the beam could also be used. For example, each beam could be identified by its angle or by assigning a logical beam ID to the beam.

In an embodiment, the rhythm of a particular TRP is dependent upon an identifier of that TRP. For example, each of the eNBs 200A and 200B shown in FIG. 7 could be associated with a different identifier (such as a different cell identifier or cell ID), and a different rhythm to be associated with each eNB could be determined on the basis of these identifiers. Thus, in the example of FIG. 7, eNB 200A could be associated with a first cell ID which indicates that Rhythm 1 of FIG. 5 should be used and eNB 200B could be associated with a second, different, cell ID which indicates that Rhythm 2 of FIG. 5 should be used. In this embodiment, TRP deployment could involve TRP identifier planning so as to ensure that neighbouring TRPs each have a different TRP identifier. Such an arrangement means that each TRP will be associated with a different rhythm, thus reducing the effort in assigning rhythms to each TRP.

In an embodiment, a set of beam sweeping rhythms are defined, for example, in the relevant network specifications. Each TRP can then be configured in advance with one of these defined rhythms.

Figure 8:
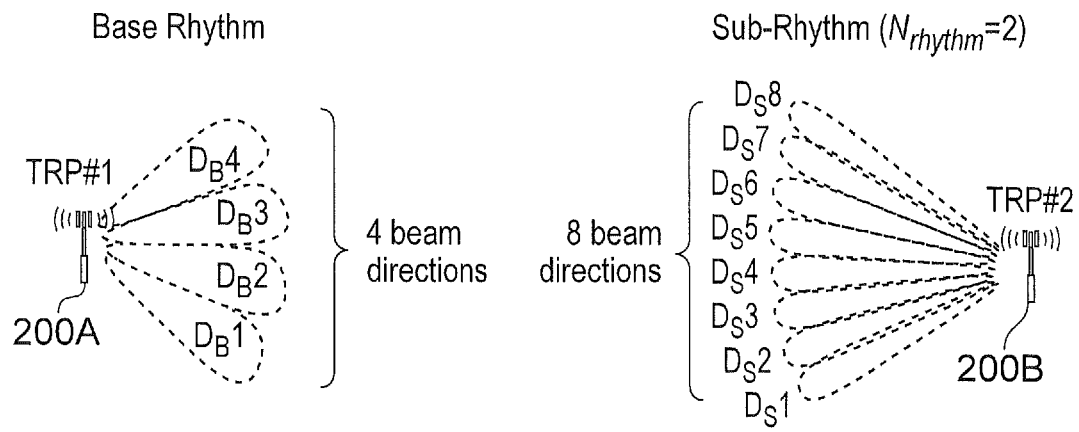
FIG. 8 schematically illustrates the derivation of a sub-beam sweeping rhythm from a base beam sweeping rhythm.

In an embodiment, a sub-rhythm can be formed from another (base) rhythm. The number of beams in a sub-rhythm is an integer multiple $N_{rhythm}$ of the number of beams in the base rhythm. For example, a base rhythm can have four different beam directions in one sweep and a sub-rhythm can be defined where the sub-rhythm has $N_{rhythm}=2\times$ the number of beam directions of the base rhythm, that is, 8 beam directions. This allows, for example, different TRPs to have different numbers of beams in a periodic beam sweep. This is exemplified in FIG. 8, for example, in which eNB 200A uses a base rhythm with 4 beam directions $\{D_B1, D_B2, D_B3, D_B4\}$ and eNB 200B uses a sub-rhythm of the base rhythm of eNB 200A with $N_{rhythm}=2$. The rhythm of eNB 200B thus has 8 beam directions $\{D_S1, D_S2, D_S3, D_S4, D_S5, D_S6, D_S7, D_S8\}$.

In an embodiment, a sub-rhythm beam width is narrower than its corresponding base rhythm beam. In other words, the sub-rhythm beam forms a sub-region of its corresponding base rhythm beam. For example, a sub-rhythm beam width can be 15° whilst that in the corresponding base rhythm has a beam width of 30°. This may be achieved, for example, by the base rhythm beam width being a multiple of $N_{rhythm}$ of that of the sub-rhythm beam width. The present technique thus recognises that different TRPs can use different beam widths for beam sweeping. It is noted that the beam width of a particular TRP is dependent upon the number of antenna elements of that TRP, and that this can differ for different TRPs in the network.

A rhythm duration is the time period for which a particular beam direction is maintained (the previously mentioned time periods $\tau_x$ (for example, $\tau_1, \tau_2$, etc.) are thus each an example of a rhythm duration). In an embodiment, a base rhythm duration is longer than that of its sub-rhythm. That is, sub-rhythm duration is a portion of the base rhythm duration. For example, the base rhythm duration may be $N_{rhythm}$ times longer than that of its sub-rhythm.

Figure 9:
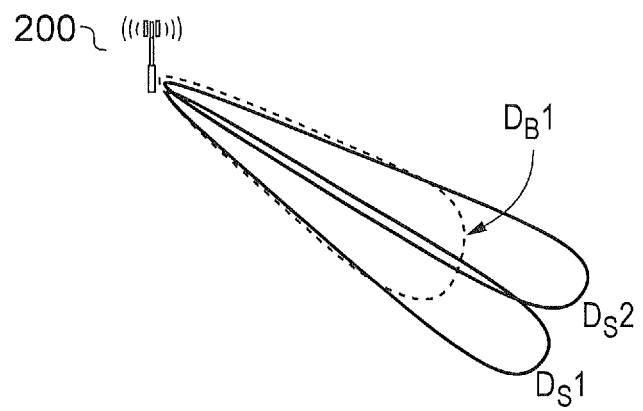
FIG. 9 schematically illustrates the relative widths of a beam of a sub-beam sweeping rhythm and a beam of a base beam sweeping rhythm.

In an embodiment, $N_{rhythm}$ beams of a sub-rhythm are derived from a beam of a base rhythm, and the $N_{rhythm}$ beams of the sub-rhythm cover the same width as the beam of the base rhythm. If the energy of each of the $N_{rhythm}$ beams is such that the combined energy of the $N_{rhythm}$ beams is the same as that of the base rhythm's beam, then the $N_{rhythm}$ beams will cover the same area as the base rhythms beam. Alternatively, if one or more of the $N_{rhythm}$ sub-beams have a higher energy, then they will reach further into the distance. This latter case is exemplified in FIG. 9, where $N_{rhythm}=2$ and the base rhythm beam $D_B1$ forms two sub-rhythm beams $D_S1$ and $D_S2$. Here, the combined beams of $D_S1$ and $D_S2$ occupy the same width as that of $D_B1$ and each of the beams $D_S1$ and $D_S2$ has a further reach than the beam $D_B1$.

With the above described embodiments, if two base rhythms are orthogonal, then their respective sub-rhythms will also be orthogonal. Furthermore, a sub-rhythm of a base rhythm will be orthogonal to another base rhythm if the two base rhythms are orthogonal. Hence, a set of base rhythms can be defined and TRPs using different beam widths or number of beam directions can derive their rhythms from this set of base rhythms. This is beneficial if, for example, an identifier such as a Cell ID is indicative of the base rhythm to be used (as previously described), since, as long as the identifiers of two adjacent TRPs are different, then it doesn't matter if the TRPs have a different number of beam directions per beam sweep.

Figure 10:
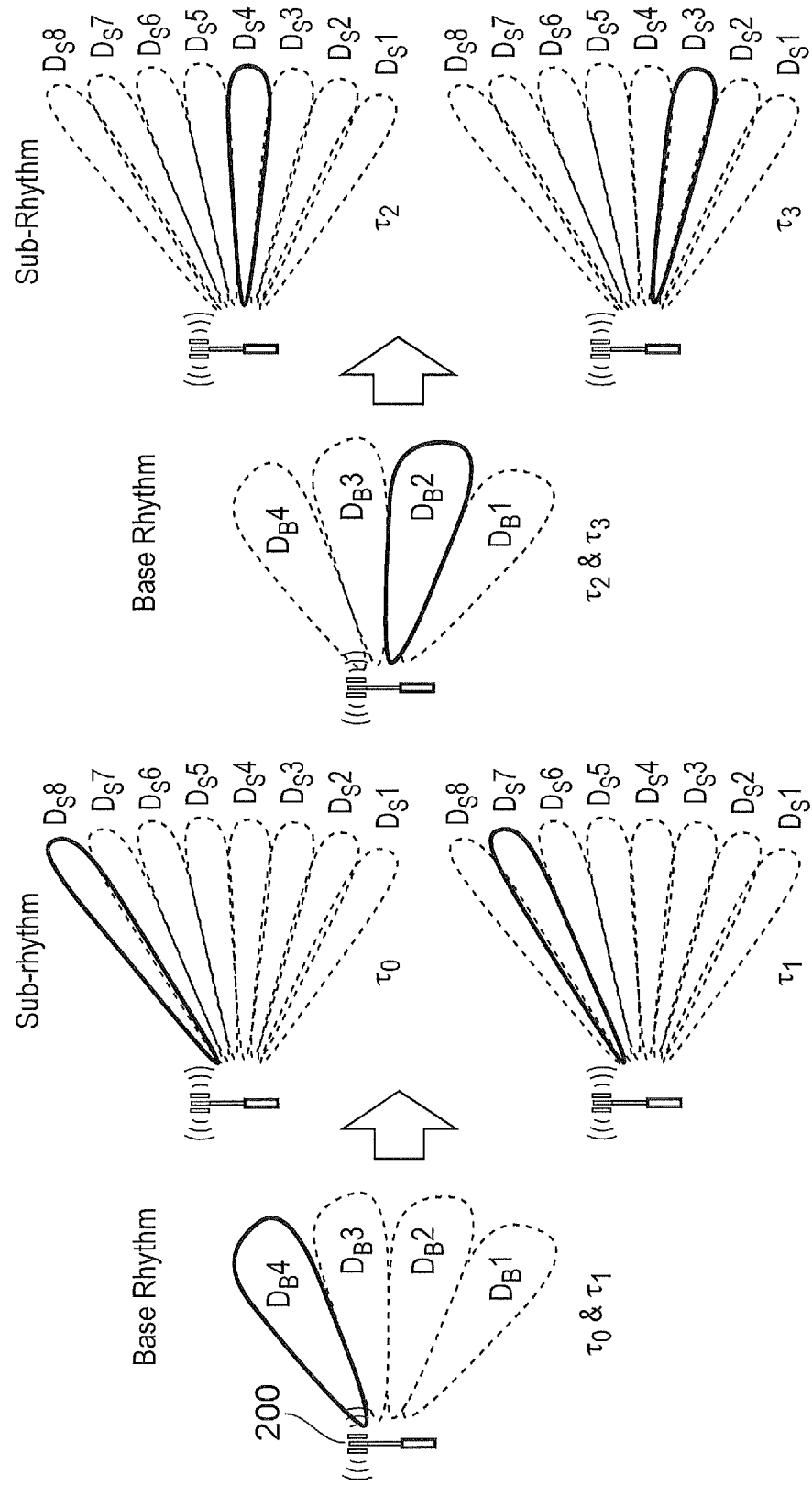
FIG. 10 schematically illustrates the generation of orthogonal sub-beam sweeping rhythms on the basis of orthogonal base beam sweeping rhythms.
Figure 10:
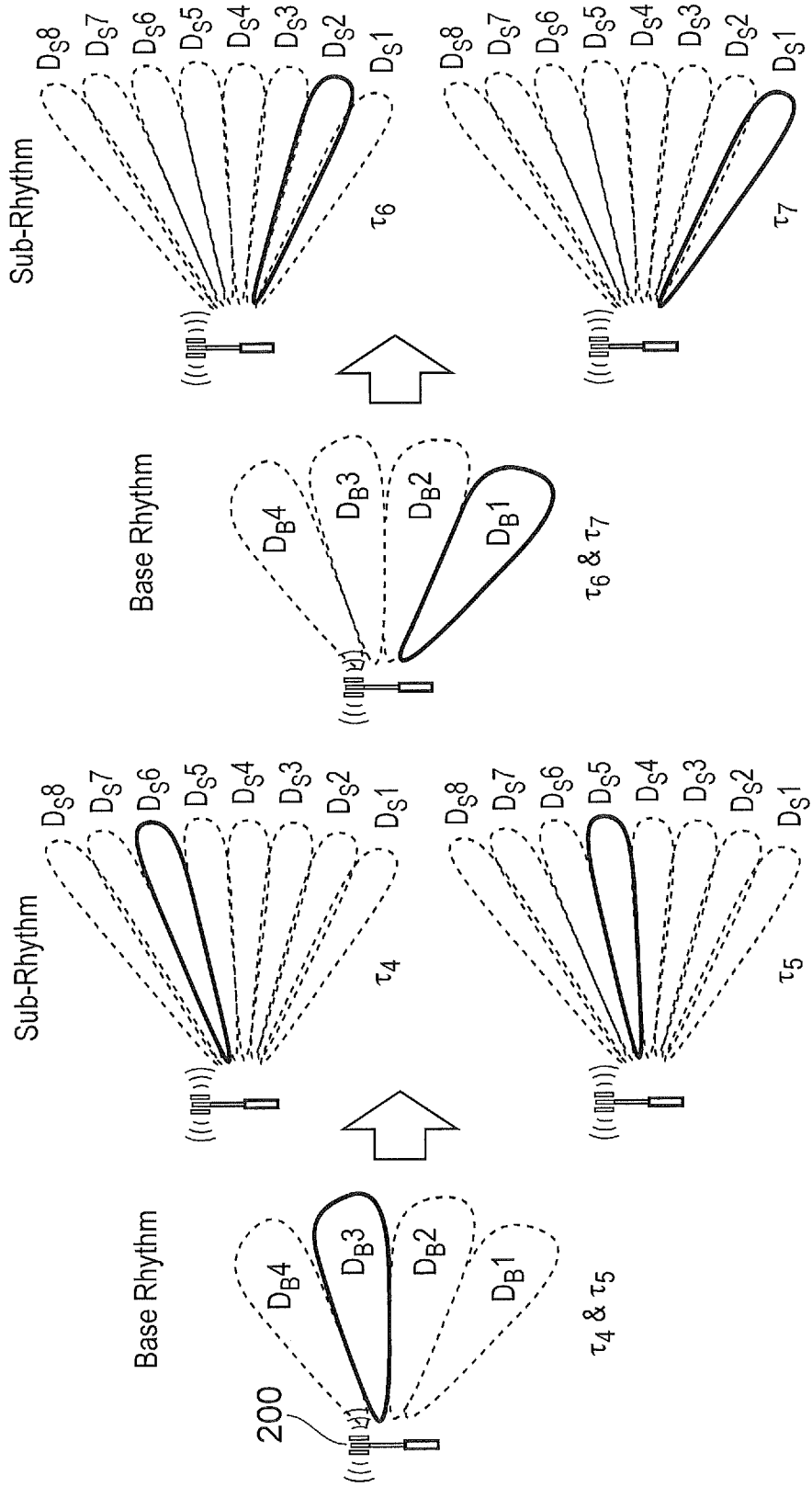

FIG. 10 shows an example in which $N_{rhythm}=2$ and a base rhythm $\{D_B4, D_B2, D_B3, D_B1\}$ (with 4 beam directions) is used to derive a sub-rhythm $\{D_S8, D_S7, D_S4, D_S3, D_S6, D_S5, D_S2, D_S1\}$ (with 8 beam directions). It will be appreciated that if the base rhythm is orthogonal to the base the rhythm of another TRP, then the sub-rhythm will also be orthogonal to the base rhythm of the other TRP (and any sub-rhythm of the other TRP derived from this base rhythm in the way described). This is true even if the sub-rhythm is changed, as long as each of the sub-beams of the sub-rhythm are activated only within the time period for which their associated base rhythm beam is activated (thus, for example, as long as $D_S8$ and $D_S7$ are activated only during the activation period of $D_B4$, $D_S3$ and $D_S4$ are activated only during the activation period of $D_B2$, etc.). Thus, for example, a sub-rhythm $\{D_S7, D_S8, D_S3, D_S4, D_S5, D_S6, D_S1, D_S2\}$) in FIG. 10 would also be an acceptable sub-rhythm.

Figure 11:
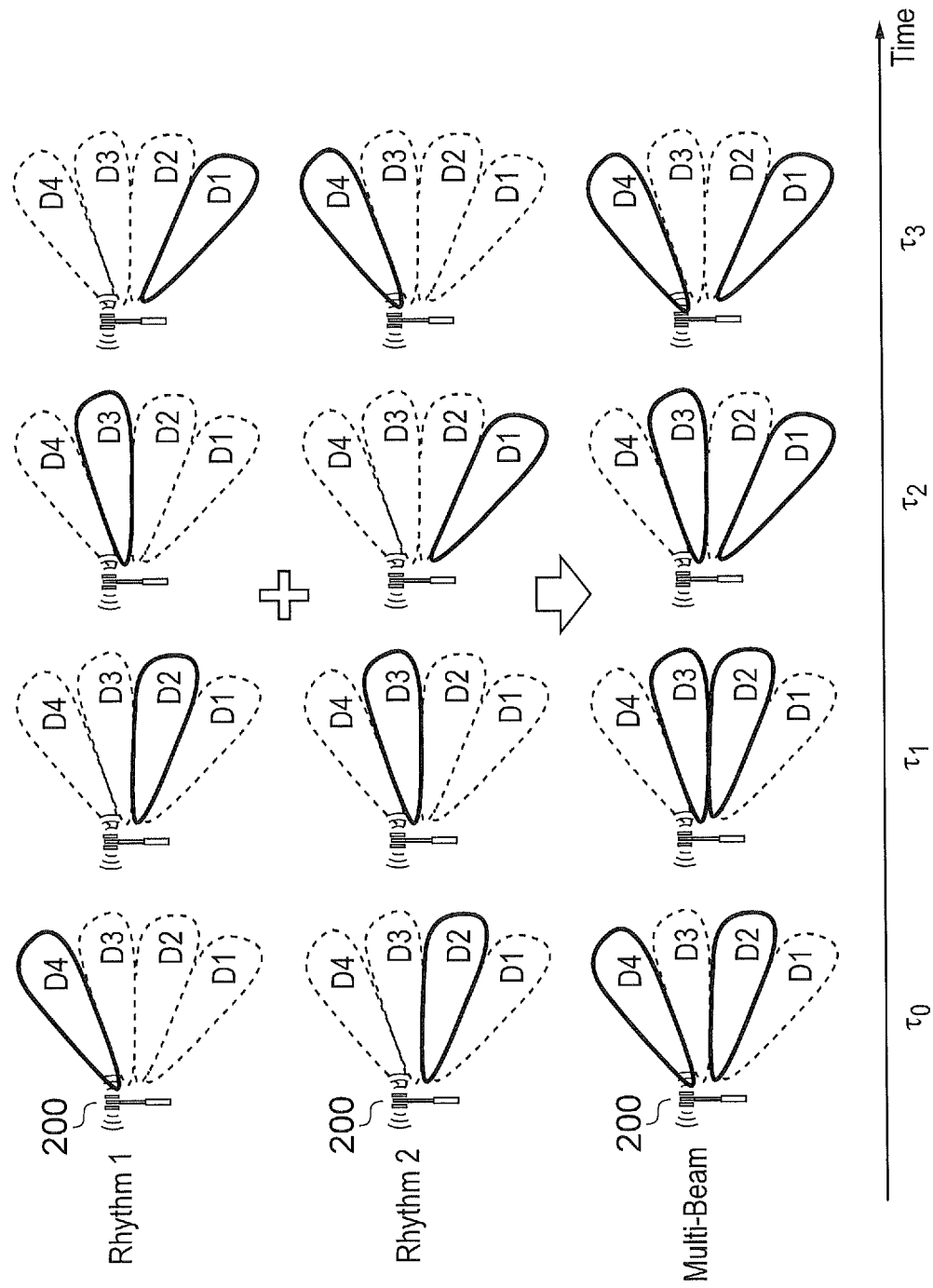
FIG. 11 schematically illustrates the generation of a multi-beam sweeping rhythm.

In an embodiment, a TRP (such as eNB 200) can form multiple beams at a time, and so a rhythm consisting of multiple simultaneous beams is beneficial. Recognising this, a multi-beam rhythm can be formed by two or more orthogonal single beam rhythms. An example is shown in FIG. 11, where two single beam rhythms, Rhythm 1={D4, D2, D3, D1} and Rhythm 2={D2, D3, D1, D4}, are used to form a multi-beam (in this case, a dual-beam) rhythm {D2+D4, D2+D3, D1+D3, D1+D4}. It is noted that, if the 4 single beam rhythms are orthogonal to each other, then multi-beam rhythms formed from respective sets of 2 of these single beam rhythms will also be orthogonal to each other.

In an embodiment, a TRP (such as eNB 200) changes its rhythm in time. That is the rhythm in a TRP can hop from one rhythm to another. For example, a TRP can repeat Rhythm 1 of FIG. 11 for a predetermined time period and then change to Rhythm 2 of FIG. 11 for another predetermined time period (the TRP then changes back to Rhythm 1 and the process is repeated). It will be appreciated that the TRP can hop between more than two rhythms. This embodiment avoids two inter-cell beams from consistently interfering with each other. In other words, it randomises inter-cell beam interference among adjacent cells. For example if eNB 200A has rhythm {D1, D3, D2, D4} and adjacent eNB 200B has rhythm {D4, D3, D2, D1}, then there will be constant interference for beams D2 & D3. As previously mentioned, this may be the case in circumstances where it is not possible for all neighbouring TRPs to have mutually orthogonal beam rhythms. However, if eNB 200A periodically hops to another rhythm, such as {D3, D2, D1, D4}, then the inter-beam interference for beams D2 & D3 is alleviated during these periods.

In an embodiment, the UE 400 can be made aware of the hopping pattern for the beams, such that it knows in which time periods it should be decoding signals for a particular beam. For example, consider a TRP that has the following rhythms in different hops in the time periods $\{\tau_1, \tau_2, \tau_3, \tau_4\}$:

Hop1: {D1, D3, D2, D4}
Hop2: {D3, D2, D1, D4}

If the UE 400 is made aware of these hopping patterns then, for example, when the UE 400 is located in the geographical region defined by beam D1, the UE 400 knows that it should decode the beam in the following time periods:

Hop1: $\tau_1$
Hop2: $\tau_3$

Furthermore, if the UE 400 understands that beams from two TRPs will interfere with one another during certain hops, it can wait to decode the beams in the hops where interference does not occur (or, at least, where there is less interference). The UE can determine the hopping pattern of the various beams based on, for example, system information or an identifier of the TRP (such as the cell-ID) serving the UE.

In an embodiment, rhythm hopping is applied and the transport blocks of information (e.g. common signaling information) are redundantly coded across the multiple hops. In this case, if two beams interfere with one another during one of the hops, then information can still be decoded by the UE 400 using the redundancy in the encoding.

Figure 12:
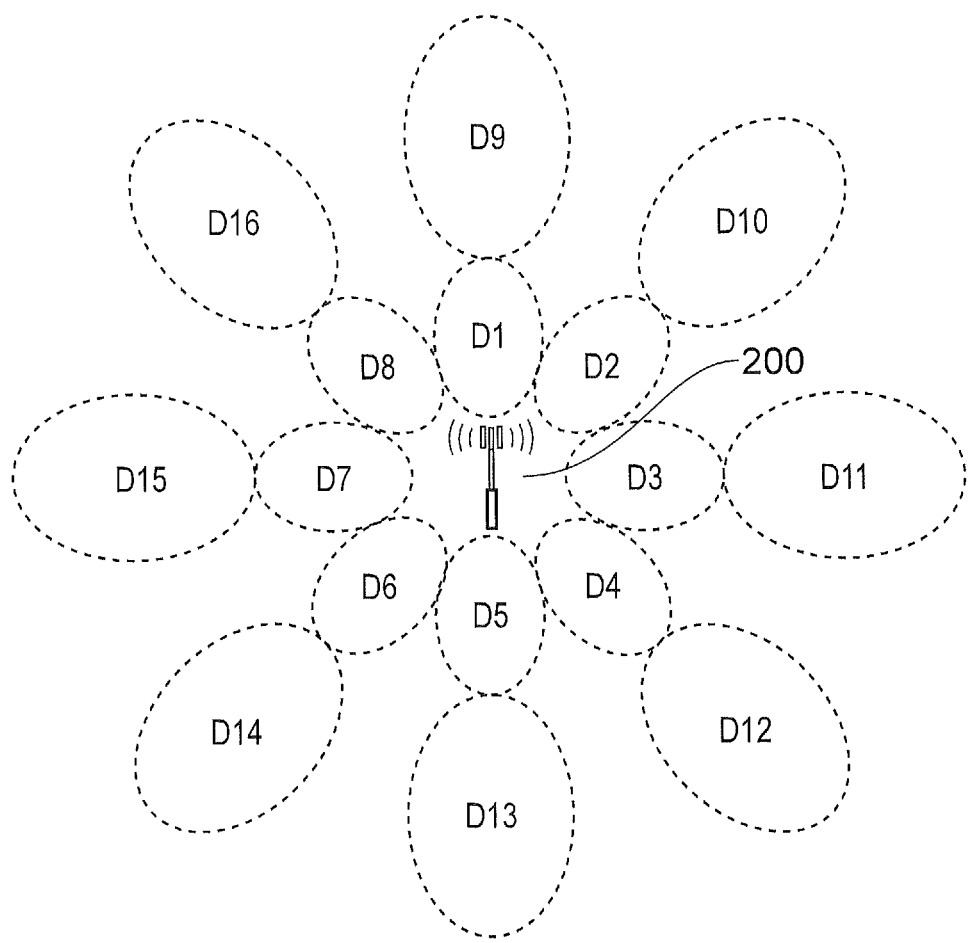
FIG. 12 schematically illustrates a two dimensional (2D) beam arrangement.

The examples in previous embodiments use a one dimensional beam where the beam is swept in a horizontal manner. For NR with multiple antenna elements, two dimensional (2D) or even three dimensional (3D) beam directions can be formed. It will be appreciated that the described embodiments can be extended to higher dimensions. For example, FIG. 12 shows a bird's eye view of a 2D beam consisting of 16 beam positions (D1 to D16). It will be appreciated that a rhythm can be formed using the 16 beam positions in a similar way as described above for the 1D beam position case.

Figure 13:
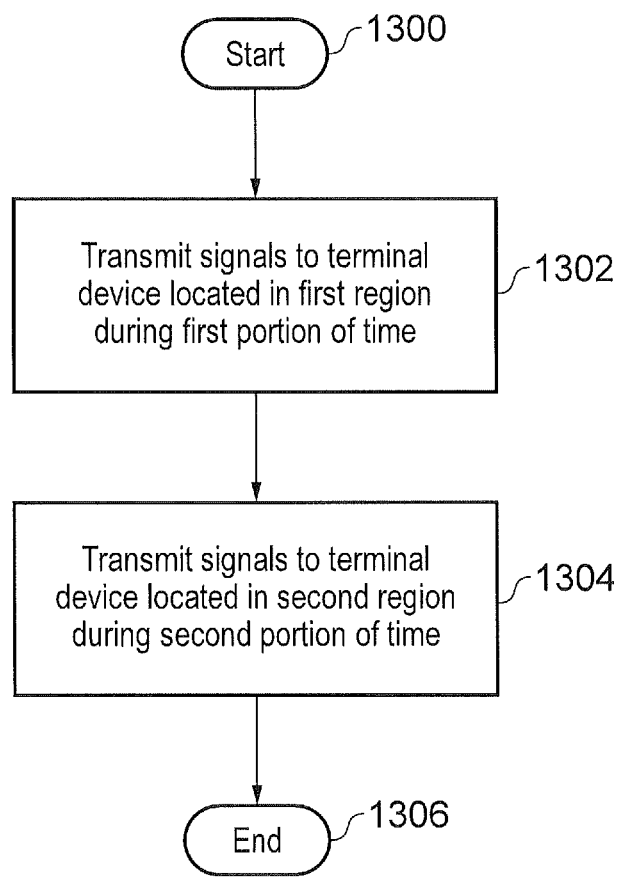
FIG. 13 shows a flow chart schematically illustrating a method according to an embodiment.

FIG. 13 shows a flow chart schematically showing a process according to the present technique. The process starts at step 1300. At step 1302, during a first portion of a periodically repeating time duration, radio signals are transmitted from infrastructure equipment to a terminal device located within a first one of a plurality of predetermined geographical regions. At step 1304, during a second portion of the periodically repeating time duration, radio signals are transmitted from the infrastructure equipment to a terminal device located within a second one of the plurality of predetermined geographical regions. The process then ends at step 1306.

It will be appreciated from the above description that the term "beam" should generally be understood to mean a predetermined geographical region within which an infrastructure equipment may transmit radio signals to a terminal device. When a beam is "active", the infrastructure equipment is able to transmit radio signals to a terminal device located within that predetermined geographical region. On the other hand, when a beam is "inactive", the infrastructure equipment is not able to transmit radio signals to a terminal device located within that predetermined geographical region.

Various features of embodiments of the present technique are defined by the following numbered clauses.

1. First infrastructure equipment for use with a wireless telecommunications system, the first infrastructure equipment comprising:
   a controller; and
   a transceiver; wherein
   the controller is operable to control the transceiver to transmit radio signals for reception by a terminal device located within a first one of a plurality of predetermined geographical regions during a first portion of a periodically repeating time duration and to transmit radio signals for reception by a terminal device located within a second, different, one of the plurality of predetermined geographical regions during a second, different, portion of the periodically repeating time duration, wherein the first and second portions of the periodically repeating time duration are set such that, for at least one of the first and second predetermined geographical regions, the transceiver transmits signals for reception by a terminal device in the at least one of the first and second predetermined geographical regions only when no transmissions are transmitted from a second infrastructure equipment of the wireless telecommunications system for reception by a terminal device in at least a portion of the at least one of the first and second predetermined geographical regions.

2. First infrastructure equipment according to clause 1, wherein the first and second portions of the periodically repeating time duration are set such that at least one of:
   (a) during the first portion, the second infrastructure equipment is operable to transmit signals for reception by a terminal device only in a third one of the plurality of predetermined geographical areas, wherein at least a portion of the third one of the plurality of predetermined geographical areas is non-overlapping with the first one of the plurality of predetermined geographical areas; and
   (b) during the second portion, the second infrastructure equipment is operable to transmit signals for reception by a terminal device only in a fourth one of the plurality of predetermined geographical areas, wherein at least a portion of the fourth one of the plurality of predetermined geographical areas is non-overlapping with the second one of the plurality of predetermined geographical areas.

3. First infrastructure equipment according to clause 2, wherein the controller is operable to associate the first portion of the periodically repeating time duration with the first one of the plurality of predetermined geographical regions and to associate the second portion of the periodically repeating time duration with the second one of the plurality of predetermined geographical regions on the basis of an identifier of the first infrastructure equipment, the identifier of the first infrastructure equipment being different to an identifier of the second infrastructure equipment on the basis of which the second infrastructure equipment associates the first portion of the periodically repeating time duration with the third one of the plurality of predetermined geographical regions and the second portion of the periodically repeating time duration with the fourth one of the plurality of predetermined geographical regions.

4. First infrastructure equipment according to any preceding clause, wherein at least one of:
(a) the first one of the plurality of predetermined geographical regions comprises a plurality of sub-regions, and the controller is operable to control the transceiver to transmit radio signals for reception by a terminal device located within any one of the sub-regions during the first portion of the periodically repeating time duration; and
(b) the second one of the plurality of predetermined geographical regions comprises a plurality of sub-regions, and the controller is operable to control the transceiver to transmit radio signals for reception by a terminal device located within any one of the sub-regions during the second portion of the periodically repeating time duration.

5. First infrastructure equipment according to clause 4, wherein at least one of:
(a) the first one of the plurality of predetermined geographical regions comprises a plurality of sub-regions, and the controller is operable to control the transceiver to transmit radio signals for reception by a terminal device located within a first one of the sub-regions during a first portion of the first portion of the periodically repeating time duration, and to transmit radio signals for reception by a terminal device located within a second, different, one of the sub-regions during a second, different, portion of the first portion of the periodically repeating time duration; and
(b) the second one of the plurality of predetermined geographical regions comprises a plurality of sub-regions, and the controller is operable to control the transceiver to transmit radio signals for reception by a terminal device located within a first one of the sub-regions during a first portion of the second portion of the periodically repeating time duration, and to transmit radio signals for reception by a terminal device located within a second, different, one of the sub-regions during a second, different, portion of the second portion of the periodically repeating time duration.

6. First infrastructure equipment according to any preceding clause, wherein the controller is operable to control the transceiver to periodically switch between transmitting radio signals for reception by a terminal device located within the first one of the plurality of predetermined geographical regions during the first portion of the periodically repeating time duration and transmitting radio signals for reception by a terminal device located within one of the plurality of predetermined geographical regions other than the first predetermined geographical region during the first portion of the periodically repeating time duration, and between transmitting radio signals for reception by a terminal device located within the second one of the plurality of predetermined geographical regions during the second portion of the periodically repeating time duration and transmitting radio signals for reception by a terminal device located within one of the plurality of predetermined geographical regions other than the second predetermined geographical region during the second portion of the periodically repeating time duration.

7. A terminal device for use with a wireless telecommunications system, the terminal device comprising:
a controller; and
a transceiver; wherein
the controller is operable to:
when the terminal device is located in a first one of a plurality of geographical regions, control the transceiver to receive radio signals from first infrastructure equipment of the wireless telecommunications system during a first portion of a periodically repeating time duration; and
when the terminal device is located in a second, different, one of the plurality of geographical regions, control the transceiver to receive radio signals from the first infrastructure equipment during a second, different, portion of the periodically repeating time duration;
wherein the first and second portions of the periodically repeating time duration are set such that, for at least one of the first and second predetermined geographical regions, when the terminal device is located within at least a portion of the at least one of the first and second predetermined geographical regions, the transceiver receives signals from the first infrastructure equipment only when no transmissions are received by the terminal device from second infrastructure equipment of the wireless telecommunications system.

8. A method of operating first infrastructure equipment for use with a wireless telecommunications system, the first infrastructure equipment comprising a controller and a transceiver, wherein the method comprises:
controlling the transceiver to transmit radio signals for reception by a terminal device located within a first one of a plurality of predetermined geographical regions during a first portion of a periodically repeating time duration; and
controlling the transceiver to transmit radio signals for reception by a terminal device located within a second, different, one of the plurality of predetermined geographical regions during a second, different, portion of the periodically repeating time duration;
wherein the first and second portions of the periodically repeating time duration are set such that, for at least one of the first and second predetermined geographical regions, the transceiver transmits signals for reception by a terminal device in the at least one of the first and second predetermined geographical regions only when no transmissions are transmitted from a second infrastructure equipment of the wireless telecommunications system for reception by a terminal device in at least a portion of the at least one of the first and second predetermined geographical regions.

9. A method of operating a terminal device for use with a wireless telecommunications system, the terminal device comprising a controller and a transceiver, wherein the method comprises:
when the terminal device is located in a first one of a plurality of geographical regions, controlling the transceiver to receive radio signals from first infrastructure equipment of the wireless telecommunications system during a first portion of a periodically repeating time duration; and when the terminal device is located in a second, different, one of the plurality of geographical regions, controlling the transceiver to receive radio signals from the first infrastructure equipment during a second, different, portion of the periodically repeating time duration;

wherein the first and second portions of the periodically repeating time duration are set such that, for at least one of the first and second predetermined geographical regions, when the terminal device is located within at least a portion of the at least one of the first and second predetermined geographical regions, the transceiver receives signals from the first infrastructure equipment only when no transmissions are received by the terminal device from second infrastructure equipment of the wireless telecommunications system.

10. Integrated circuitry for first infrastructure equipment for use with a wireless telecommunications system, the integrated circuitry comprising:
a controller element; and
a transceiver element; wherein
the controller element is operable to control the transceiver element to transmit radio signals for reception by a terminal device located within a first one of a plurality of predetermined geographical regions during a first portion of a periodically repeating time duration and to transmit radio signals for reception by a terminal device located within a second, different, one of the plurality of predetermined geographical regions during a second, different, portion of the periodically repeating time duration, wherein the first and second portions of the periodically repeating time duration are set such that, for at least one of the first and second predetermined geographical regions, the transceiver element transmits signals for reception by a terminal device in the at least one of the first and second predetermined geographical regions only when no transmissions are transmitted from a second infrastructure equipment of the wireless telecommunications system for reception by a terminal device in at least a portion of the at least one of the first and second predetermined geographical regions.

11. Integrated circuitry for a terminal device for use with a wireless telecommunications system, the integrated circuitry comprising:
a controller element; and
a transceiver element; wherein
the controller element is operable to:
when the terminal device is located in a first one of a plurality of geographical regions, control the transceiver element to receive radio signals from first infrastructure equipment of the wireless telecommunications system during a first portion of a periodically repeating time duration; and
when the terminal device is located in a second, different, one of the plurality of geographical regions, control the transceiver element to receive radio signals from the first infrastructure equipment during a second, different, portion of the periodically repeating time duration;
wherein the first and second portions of the periodically repeating time duration are set such that, for at least one of the first and second predetermined geographical regions, when the terminal device is located within at least a portion of the at least one of the first and second predetermined geographical regions, the transceiver element receives signals from the first infrastructure equipment only when no transmissions are received by the terminal device from second infrastructure equipment of the wireless telecommunications system.

12. A system comprising first infrastructure equipment according to clause 1 and a terminal device according to clause 7.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009

[2] RP-160671, "New SID Proposal: Study on New Radio Access Technology," NTT DOCOMO, RAN #71

[3] R1-165364, "Support for Beam Based Common Control Plane", Nokia, Alcatel-Lucent Shanghai Bell, RAN1 #85

The invention claimed is:

1. First infrastructure equipment for use with a wireless telecommunications system, the first infrastructure equipment comprising:
a transceiver; and
a controller configured to control the transceiver to
transmit radio signals in a first direction for reception by a first terminal device located within a first geographical region of a plurality of geographical regions during a first portion of a periodically repeating time duration; and transmit radio signals in a second direction for reception by a second terminal device located within a second geographical region of the plurality of geographical regions during a second portion of the periodically repeating time duration, wherein the first direction is different than the second direction,
the second geographical region is different than the first geographical region,
the second portion is different than the first portion,
the first and second portions of the periodically repeating time duration are set, according to a first transmission pattern that is uniquely assigned to the first infrastructure equipment based on a first identifier of the first infrastructure equipment, such that the transceiver transmits signals for reception by a terminal device in at least one geographical region of the first and second geographical regions only in a case that no transmissions are transmitted from a second infrastructure equipment of the wireless telecommunications system for reception by the terminal device in at least a portion of the at least one of the first and second geographical regions,
the second infrastructure equipment transmits signals according to a second transmission pattern that is uniquely assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and
the first beam width is different that the second beam width.

2. The first infrastructure equipment according to claim 1, wherein the first and second portions of the periodically repeating time duration are set, according to the first transmission pattern, such that at least one of:
(a) during the first portion, the second infrastructure equipment is configured to transmit signals for reception by a third terminal device only in a third geographical region of the plurality of geographical regions, wherein at least a portion of the third geographical region is non-overlapping with the first geographical region; and
(b) during the second portion, the second infrastructure equipment is configured to transmit signals for reception by a fourth terminal device only in a fourth geographical region of the plurality of geographical region, wherein at least a portion of the fourth geographical region is non-overlapping with the second geographical region.

3. The first infrastructure equipment according to claim 2, wherein
the controller is configured to associate the first portion of the periodically repeating time duration with the first geographical region, and to associate the second portion of the periodically repeating time duration with the second geographical region based on an identifier of the first infrastructure equipment,
the identifier of the first infrastructure equipment being different to a second identifier of the second infrastructure equipment, and
the second identifier being on which the second infrastructure equipment associates the first portion of the periodically repeating time duration with the third geographical region and the second portion of the periodically repeating time duration with the fourth geographical region.

4. The first infrastructure equipment according to claim 1, wherein at least one of:
(a) the first geographical region comprises a first plurality of sub-regions, and the controller is configured to control the transceiver to transmit radio signals for reception by a terminal device located within any one sub-region of the first plurality of sub-regions during the first portion of the periodically repeating time duration; and
(b) the second geographical region comprises a second plurality of sub-regions, and the controller is configured to control the transceiver to transmit radio signals for reception by a terminal device located within any one sub-region of the second plurality of sub-regions during the second portion of the periodically repeating time duration.

5. The first infrastructure equipment according to claim 4, wherein at least one of:
(a) the first geographical region comprises a first plurality of sub-regions, and the controller is configured to control the transceiver to transmit radio signals for reception by a terminal device located within a first sub-region of the first plurality of sub-regions during a first portion of the first portion of the periodically repeating time duration, and to transmit radio signals for reception by a terminal device located within a second, different, sub-region of the first plurality of sub-regions during a second, different, portion of the first portion of the periodically repeating time duration; and
(b) the second geographical region comprises a second plurality of sub-regions, and the controller is configured to control the transceiver to transmit radio signals for reception by a terminal device located within a first sub-region of the second plurality of sub-regions during a first portion of the second portion of the periodically repeating time duration, and to transmit radio signals for reception by a terminal device located within a second, different, sub-region of the second plurality of sub-regions during a second, different, portion of the second portion of the periodically repeating time duration.

6. The first infrastructure equipment according to claim 1, wherein the controller is configured to control the transceiver to periodically switch between transmitting radio signals for reception by a terminal device located within the first geographical region during the first portion of the periodically repeating time duration and transmitting radio signals for reception by a terminal device located within a geographical region of the plurality of geographical regions other than the first geographical region during the first portion of the periodically repeating time duration, and between transmitting radio signals for reception by a terminal device located within the second geographical region during the second portion of the periodically repeating time duration and transmitting radio signals for reception by a terminal device located within a geographical region of the plurality of geographical regions other than the second geographical region during the second portion of the periodically repeating time duration.

7. A terminal device for use with a wireless telecommunications system, the terminal device comprising:
a transceiver; and a controller configured to:
  in a case that the terminal device is located in a first geographical region of a plurality of geographical regions, control the transceiver to receive radio signals, transmitted in a first direction from a first infrastructure equipment of the wireless telecommunications system, during a first portion of a periodically repeating time duration; and
  in a case that the terminal device is located in a second geographical region of the plurality of geographical regions, control the transceiver to receive radio signals, transmitted in a second direction from the first infrastructure equipment, during a second portion of the periodically repeating time duration, wherein
the first direction is different than the second direction,
the second geographical region is different than the first geographical region,
the second portion is different than the first portion,
the first and second portions of the periodically repeating time duration having been set, according to a first transmission pattern that is uniquely assigned to the first infrastructure equipment based on a first identifier of the first infrastructure equipment, such that the transceiver receives, in a case that the terminal device is located within at least a portion of at least one geographical region of the first and second geographical regions, signals from the first infrastructure equipment only in a case that no transmissions are received by the terminal device from a second infrastructure equipment of the wireless telecommunications system,
the second infrastructure equipment transmits signals according to a second transmission pattern that is uniquely assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and
the first beam width is different that the second beam width.

8. A method of operating first infrastructure equipment for use with a wireless telecommunications system, the first infrastructure equipment comprising a controller and a transceiver, the method comprising:
  controlling the transceiver to transmit radio signals in a first direction for reception by a first terminal device located within a first geographical region of a plurality of geographical regions during a first portion of a periodically repeating time duration; and
  controlling the transceiver to transmit radio signals in a second direction for reception by a second terminal device located within a second geographical region of the plurality of geographical regions during a second portion of the periodically repeating time duration, wherein
the first direction is different than the second direction,
the second geographical region is different than the first geographical region,
the second portion is different than the first portion,
the first and second portions of the periodically repeating time duration are set, according to a first transmission pattern that is uniquely assigned to the first infrastructure equipment based on a first identifier of the first infrastructure equipment, such that the transceiver transmits signals for reception by a terminal device in at least one geographical region of the first and second geographical regions only in a case that no transmissions are transmitted from a second infrastructure equipment of the wireless telecommunications system for reception by the terminal device in at least a portion of the at least one of the first and second geographical regions,
the second infrastructure equipment transmits signals according to a second transmission pattern that is uniquely assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and
the first beam width is different that the second beam width.

9. A method of operating a terminal device for use with a wireless telecommunications system, the terminal device comprising a controller and a transceiver, the method comprising:
  in a case that the terminal device is located in a first geographical region of a plurality of geographical regions, controlling the transceiver to receive radio signals, transmitted in a first direction from a first infrastructure equipment of the wireless telecommunications system, during a first portion of a periodically repeating time duration; and
  in a case that the terminal device is located in a second geographical region of the plurality of geographical regions, controlling the transceiver to receive radio signals, transmitted in a second direction from the first infrastructure equipment, during a second portion of the periodically repeating time duration, wherein
the first direction is different than the second direction,
the second geographical region is different than the first geographical region,
the second portion is different than the first portion,
the first and second portions of the periodically repeating time duration having been set, according to a first transmission pattern that is uniquely assigned to the first infrastructure equipment based on a first identifier of the first infrastructure equipment, such that the transceiver receives, in a case that the terminal device is located within at least a portion of at least one geographical region of the first and second geographical regions, signals from the first infrastructure equipment only in a case that no transmissions are received by the terminal device from second infrastructure equipment of the wireless telecommunications system,
the second infrastructure equipment transmits signals according to a second transmission pattern uniquely that is assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and the first beam width is different that the second beam width.

10. Integrated circuitry for first infrastructure equipment for use with a wireless telecommunications system, the integrated circuitry comprising:
a transceiver; and
a controller configured to control the transceiver to
transmit radio signals in a first direction for reception by a first terminal device located within a first geographical region of a plurality of geographical regions during a first portion of a periodically repeating time duration; and
transmit radio signals in a second direction for reception by a second terminal device located within a second geographical region of the plurality of geographical regions during a second portion of the periodically repeating time duration, wherein
the first direction is different than the second direction,
the second geographical region is different than the first geographical region,
the second portion is different than the first portion,
the first and second portions of the periodically repeating time duration are set, according to a first transmission pattern that is uniquely assigned to the first infrastructure equipment based on a first identifier of the first infrastructure equipment, such that the transceiver transmits signals for reception by a terminal device in at least one geographical region of the first and second geographical regions only in a case that no transmissions are transmitted from a second infrastructure equipment of the wireless telecommunications system for reception by the terminal device in at least a portion of the at least one of the first and second geographical regions,
the second infrastructure equipment transmits signals according to a second transmission pattern that is uniquely assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and
the first beam width is different that the second beam width.

11. Integrated circuitry for a terminal device for use with a wireless telecommunications system, the integrated circuitry comprising:
a transceiver; and
a controller configured to:
in a case that the terminal device is located in a first geographical region of a plurality of geographical regions, control the transceiver to receive radio signals, transmitted in a first direction from a first infrastructure equipment of the wireless telecommunications system, during a first portion of a periodically repeating time duration; and
in a case that the terminal device is located in a second geographical region of the plurality of geographical regions, control the transceiver to receive radio signals, transmitted in a second direction from the first infrastructure equipment, during a second portion of the periodically repeating time duration, wherein
the first direction is different than the second direction,
the second geographical region is different than the first geographical region,
the second portion is different than the first portion,
the first and second portions of the periodically repeating time duration having been set, according to a first transmission pattern that is uniquely assigned to the first infrastructure equipment based on a first identifier of the first infrastructure equipment, such that the transceiver receives, in a case that the terminal device is located within at least a portion of at least one geographical region of the first and second geographical regions, signals from the first infrastructure equipment only in a case that no transmissions are received by the terminal device from a second infrastructure equipment of the wireless telecommunications system,
the second infrastructure equipment transmits signals according to a second transmission pattern that is uniquely assigned to the second infrastructure equipment based on a second identifier of the second infrastructure equipment, such that the first transmission pattern is different than the second transmission pattern,
the first transmission pattern includes a first number of beam directions that each have a first beam width,
the second transmission pattern includes a second number of beam directions that each have a second beam width,
the first number is different than the second number, and
the first beam width is different that the second beam width.

* * * * *